Figure 1:
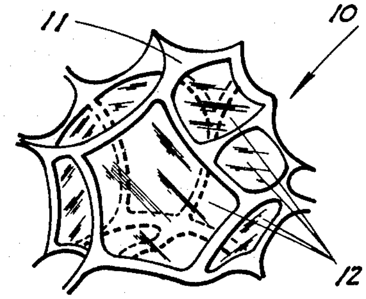
Figure 2:
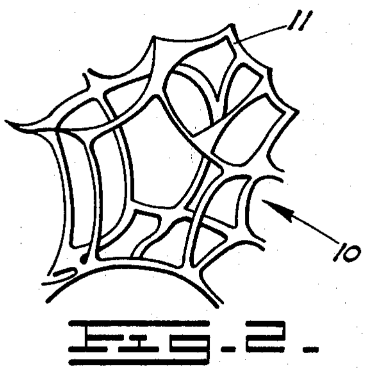
Figure 3:
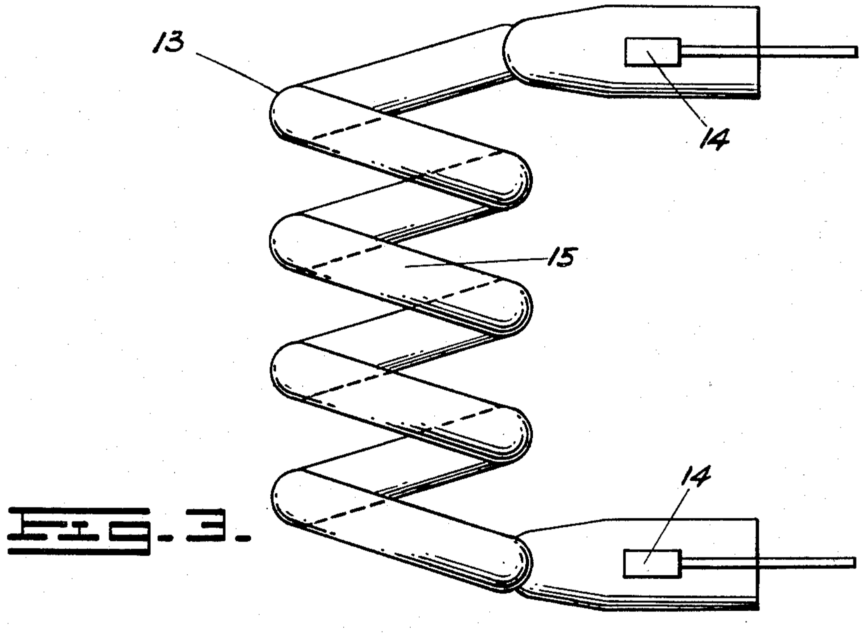
Figure 4:
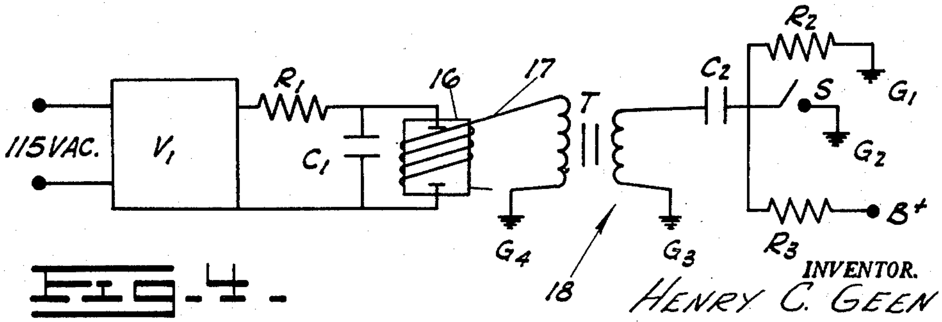

PROCESS FOR THE PREPARATION OF RETICULATED MATERIALS

Filed March 7, 1963

INVENTOR.
HENRY C. GEEN
BY
Miller, Morriss & Pappas
ATTORNEYS 3,175,030
Patented Mar. 23, 1965

3,175,030

PROCESS FOR THE PREPARATION OF RETICULATED MATERIALS

Henry C. Geen, Ann Arbor, Mich., assignor to Chemotronics, Incorporated, Ann Arbor, Mich., a corporation of Michigan Filed Mar. 7, 1963, Ser. No. 263,603
13 Claims. (Cl. 264—321)

This invention relates generally to a novel process for producing inorganic and organic reticulated materials and in particular to a process for producing reticulated flexible, semi-flexible and rigid polyurethane materials. Further, this invention relates to novel reticulated products produced by such process.

There are many cellular (i.e. open-celled) materials known to the prior art. In these materials the individual cells are formed of a three-dimensional skeletal structure of interconnected strands with membranes or windows partitioning contiguous cells and joined to the skeletal structure. The skeletal structure is almost always considerably thicker than the membranes in these cellular materials. Such cellular materials may be composed of, for example, inorganic materials, such as glass and various metals, and organic materials, such as the polyurethanes.

In recent years there has been an increased demand for reticulated materials which have the cell membranes or windows partially or totally destroyed. These reticulated materials are prepared from the cellular materials of the prior art. Thus, in these reticulated materials, the primary support is supplied by the skeletal structure since the cell membranes may be partially or totally destroyed. Examples of such reticulated materials extensively used by the prior art are the membrane destroyed or reticulated polyurethane foams which are used in various filtering and detraining applications and as garment liners.

The prior art has concerned itself almost exclusively with the production of reticulated materials of the flexible polyurethane type, especially polyester polyurethanes, because of their porosity and softness as compared to non-reticulated flexible polyurethane cellular materials.

The chemical treatment of the membranes of the flexible cellular polyurethane materials to produce a reticulated material is well known to the prior art. An example is a prior art process which utilizes a hydrolyzing agent, such as sodium hydroxide, to destroy the cell membranes. While the process effectively produces a reticulated polyester polyurethane material, there are numerous disadvantages. The precise orientation of reticulation is difficult to control by this process. Further, there are numerous steps in this process resulting in considerable cost, including the neutralization of the hydrolyzing agent after application and the washing and drying of the reticulated material produced. This process works well only with the flexible polyester polyurethane cellular materials. As a result, relatively expensive reticulated materials are produced by this process.

The other processes known to the prior art for producing reticulated polyurethanes all depend upon the use of direct chemical contact to destroy the cell membranes. The precise orientation of reticulation is difficult to control and they have the common disadvantage of producing relatively expensive reticulated polyurethane products.

It is thus an object of this invention to provide a process which is generally useful in the production of inorganic and organic reticulated materials.

Further, it is an object of this invention to provide a process for the very rapid production of these reticulated materials.

Further, it is an object of this invention to provide a process for producing reticulated materials which eliminates the need for a hydrolyzing agent or other similar material which destroys the cell membranes by direct chemical contact.

Further still, it is an object of this invention to provide a process which is simple and economical and which provides a means for a precise control over the extent of reticulation.

These and other objects will become increasingly apparent to those skilled in the art as the description proceeds.

In the drawings:

FIGURE I is a front view of an individual polyurethane cell illustrating the configuration of an individual cell.

FIGURE II is a front view of a completely reticulated cell illustrating the configuration of the individual cell illustrated in FIGURE I after the removal of the cell membranes.

FIGURE III is a front view of a photoflash lamp illustrating the helical photoflash lamp used in the preferred light pulse equipment of the present invention.

FIGURE IV is a circuit diagram illustrating schematically the preferred light pulse equipment of this invention.

It has been found that when a cellular material, either organic or inorganic, having a skeletal structure thicker than its membranes, the cell membranes being volatilizable or heat destructable, is subjected to a light pulse of sufficient intensity or energy, some portion of or all of the cell membranes are removed. Further, it has been found that the extent of reticulation can be controlled precisely. It has also been found that novel reticulated products are produced by the process of this invention.

The cellular materials which can be effectively treated by the process of the present invention may be inorganic or organic. Thus, for instance, inorganic cellular materials such as glass, ceramic, and metal foams and the like can effectively be treated.

Further, organic foams such as, for instance, polyurethane cellular materials may be reticulated by the process of the present invention. The cellular organic materials, usually polyurethane foams, are widely used commercially. Their method of preparation by the prior art and their method of treatment by the process of the present invention are set forth herein in detail.

Foamed or cellular polyurethane products are conventionally made by reacting an organic isocyanate, e.g. a polyisocyanate, with a polyol or a polyester along with various other materials. A gas or vapor is usually generated in situ while the reaction mixture remains in the plastic or fluid state. The generation of this gas results in the formation of bubbles, approximately spherical in form, in the plastic material. As these bubbles expand, cells are formed and the resulting structure of the material is comprised of a skeletal structure and cell membranes.

Illustrative of a common prior art method of preparation of a flexible polymeric polyester polyurethane cellular material is Example I.

EXAMPLE I

*Step A*

Into a closed container, equipped with an agitator and means for maintaining a nitrogen gas sweep, were charged at room temperature, 50 parts by weight of an approximately 80:20 isomeric mixture of toluene-2,4-diisocyanate and toluene-2,6-diisocyanate and 50 parts by weight of a polyester resin (alkyd) (Parapfex U–148 sold by Rohm and Haas Company, Philadelphia, Pa.), having the following properties:

| | |
|---|---|
| Average molecular weight | 1800–2000. |
| Equivalent weight | 745–830. |
| Hydroxyl number | 65–75. |
| Acid number | 3 maximum. |
| Water content | 0.25 percent maximum. |
| Average hydroxyls per molecule | 2.42. |

The above-described mixture was agitated under a maintained nitrogen atmosphere for four hours, the temperature rising to approximately 32° C.

*Step B*

Eighty (80) parts by weight of the polyester resin (alkyd) referred to in Step A above, 0.6 part by weight of a polyoxyethylated vegetable oil dispersing agent (Emulphorel–719 sold by General Aniline and Film Corporation, New York City, New York), 4.5 parts by weight of water and 1.9 parts by weight of diethylethanol amine were blended at room temperature.

*Step C*

One hundred (100) parts by weight of the reaction mixture of Step A were added to 87 parts by weight of the reaction mixture of Step B and thoroughly mixed for about 20 seconds at a starting temperature of about 25° C. The mixture was then immediately poured into a container of sufficient volume to permit expansion. After about 15 minutes the product set into a cellular mass, the temperature rising to about 75° C. The container together with the foamed cellular mass was placed in an oven and held at about 70° C. for approximately 16 hours. The product, a flexible polyester polyurethane resin, was in the form of a cellular or foamed material which was then removed from the container and cut into blocks. Materials prepared in this manner have been successfully used in the process of the present invention.

Another conventionally prepared polyurethane resin is the flexible polyalkylene ether polyurethane cellular material. Illustrative of the method of preparation of a common type is Example II.

EXAMPLE II

*Step A*

Into a closed, agitated vessel, equipped with a nitrogen gas sweep, were charged, at 40° C., 100 parts by weight of a molten polyalkylene ether having a hydroxyl number of 37.6, water content of 0.04%, and melting point of about 35° C., identified as "Teracol 30" which is believed to be a 1,4-polybutylene ether glycol (E. I. du Pont and Company, Inc., Wilmington, Delaware), and 12.6 parts by weight of the toluene-2,4- and 2,6-diisocyanate (80:20 mixture employed in Example I). There was a mildly exothermic reaction, the temperature rising to about 45–50° C. Heat was then applied and the mixture was maintained at 60° for two and one-half hours. An additional 12.6 parts of the isomeric diisocyanate mixture was then added and the temperature was raised and maintained at 140° C. for an additional two and one-half hours. The charge was then cooled to 50° C. and a further 3.7 parts by weight of the isomeric mixture of the diisocyanate was added to the reaction mixture. Finally, the product was allowed to cool to room temperature of about 25° C.

*Step B*

A blend, at 30° C., was prepared of 51 parts by weight of dioctyl sebacate, a plasticizer-softener; 10 parts by weight of n-methyl-morpholine and 2.5 parts by weight of triethylamine catalyst; 5.0 parts by weight of a conventional silicone foam stabilized (Dow Corning DC–200, 50 cstks., a polydimethyl siloxane); and 22.5 parts by weight of water.

*Step C*

To the reaction mixture of Step B were added 1000 parts by weight of the reaction mixture of Step A, and the mixture was stirred rapidly for about 20 seconds. Immediately thereafter the mass was poured into a container of sufficient volume to permit expansion; and after about 30 minutes the container together with the foamed mass was placed in an oven and maintained at 70° C. for about 16 hours. The product was a polyalkylene ether polyurethane resin, in the form of an open cellular structure which was removed from the container and cut into blocks. This material was also used in the process of the present invention.

Examples I and II illustrate the conventional methods for the preparation of particular polyester and polyether polyurethane foams utilized by the prior art. It was polyurethane materials such as these that were treated by the process of the present invention. It will be appreciated that there are many variations of the polyurethane type cellular or foam materials whether rigid, semi-rigid or flexible and all are useful as starting materials in the process of the present invention. There may be variations in the type of polyisocyanate material used. These polyisocyanate materials are reacted with many different materials containing an active hydrogen. Further, it will be appreciated that Examples I and II are only illustrative of the preparation of the conventional polyurethane materials. There are many other cellular materials, organic and inorganic, that can be treated by the process of the present invention and which are readily available as starting materials. The production of foamed cellular structures of isocyanate-derived polymers of various types is well understood in the polymer art, and is described for example in "German Plastics Practice," published by Debell and Richardson, 1946, chapter 21, "Plastic Foams," pages 462–465; in "Papers Presented at the Atlantic City Meeting: Synthesis of Isocyanate Polymers," published by the American Chemical Society, Division of Paints, Plastics and Printing Ink Chemistry, September 1956; and in the patent literature.

FIGURE I illustrates an individual cell 10 in a polyurethane cellular material, produced by the methods of Examples I and II. It consists of a skeletal structure 11 and cell membranes 12. The skeletal structure 11 supports the cell membranes 12 and the combination forms an individual cell 10. When the cell membranes 12 are destroyed, a reticulated material is produced.

FIGURE II illustrates the cell 10 shown in FIGURE I after complete reticulation. Thus only the skeletal structure 11 is left after reticulation. Partial reticulation would leave some of the cell membranes 12.

The various cellular materials of the prior art were subjected to a light pulse of sufficient intensity or energy to produce the reticulated materials of this invention. There are various means for providing this light pulse.

The equipment utilized in the process of the present invention is a photoflash lamp whose construction has been previously reported in the art. A particular photoflash lamp is illustrated in FIGURE III. In its simpiest form, it consists of a transparent tube 13 such as a quartz tube, which has electrodes 14 sealed through its ends. This tube 13 can have essentially any desired configuration. For example, the tube 13 may have a coiled or helical configuration as in FIGURE III. The size and configuration of the tube 13 depends primarily on the application. The tube 13 is filled with a gaseous material 15.

The preferred gases are those which do not yield products that react with the inner surfaces of the photoflash lamp, such gases being xenon or argon, for example, which are classified among the rare gases in the periodic table of elements. The gaseous material is generally maintained at less than atmospheric pressure within the photoflash lamp.

FIGURE IV illustrates a schematic circuit incorporating a photoflash lamp 16. A capacitor bank $C_1$ which is in parallel with the photoflash lamp 16 is connected across a high voltage direct current (D.C.) power supply $V_1$, supplied by a 115 volt alternating current source, as shown in the FIGURE IV. A suitable series resistance $R_1$ is inserted between the capacitor bank $C_1$ and the power supply $V_1$ to limit the charging current.

During operation, the capacitor or capacitor bank $C_1$ is charged to the desired high voltage by the high voltage D.C. supply $V_1$. The trigger switch S is then closed, causing a high voltage pulse to be delivered to the trigger wire 17 which is in the vicinity of the lamp 16. This trigger pulse causes sufficient ionization of the gas within the lamp 16 to allow the storage capacitor $C_1$ to discharge its energy through the lamp 16 creating an intense light pulse.

In practice, the lamp 16 may be operated either above or below its hold off voltage. The hold off voltage is defined as the potential above which the gas breakdown in the lamp 16 occurs spontaneously. Thus, when the hold off voltage is exceeded, spontaneous breakdown of the gas allows the capacitor bank $C_1$, to discharge its energy through the lamp 16 without the use of the external trigger pulse circuit 18. When operating above the hold off voltage, an electronic switch (not shown) must be inserted in the circuit so that, upon actuation, it will connect the lamp 16 across the capacitor $C_1$ at the desired firing time, thus allowing the stored electrical energy to be discharged through the lamp 16 upon command.

Below the hold off voltage, it is necessary to produce sufficient ionization of the gas within the lamp 16 to allow the breakdown process to proceed. In the preferred equipment, this is accomplished by a high voltage pulse produced in the external circuit 18 having a trigger wire 17 in the close vicinity of the lamp 16. This high voltage trigger pulse pulse is induced in the secondary winding of a high turns-ratio transformer T by discharging a small capacitor $C_2$ through the primary supplied by a D.C. positive battery at $B^+$. Suitable resistances $R_2$ and $R_3$ and grounds $G_1$, $G_1$, $G_3$ and $G_4$ are provided, as shown in FIGURE IV.

Alternative means of initiating the required ionization below the hold off potential involve the use of radio frequency sources, microwave sources, Tesla coils, or other sources of ionizing radiation, such as radioactive materials. The desired source of ionizing radiation needs only to be operated in the close vicinity of the lamp to be effective.

The light originates in the recombination, de-excitation and deceleration processes involving electrons within the plasma created by passing a high electrical current through the gas within the lamp. The spectrum observed outside the lamp is limited by the spectral transmission of the quartz or other material used in the tube wall. It may be further limited, if desired, by surrounding the tube with a jacket containing a liquid or other material having the desired light filtering characteristics. When limited only by the quartz tube wall, the light extends from the ultraviolet through the visible and into the infra-red regions of the electromagnetic spectrum. Under the conditions of operation described here, the observed light has lost most of the spectral qualities characteristic of the emission spectrum of the particular gas inside the lamp; therefore, the effects of the light are essentially independent of the gas being used.

The intensity of the emitted light is dependent upon the amount of electrical current flowing through the lamp.

The total light energy emanated during a single pulse of electrical current through the lamp is approximately proportional to the quantity of electrical energy dissipated in the lamp during the pulse. The light energy input to the lamp per pulse is easily determined by the formula: $E=\frac{1}{2}CV^2$ when E is the energy in watt seconds (joules), C is the capacitance in microfarads and V is the voltage in kilovolts.

The time required for the capacitor bank to discharge its energy through the lamp is a function of the characteristics, i.e., the resistance, inductance and capacitance, of the discharge circuit. Also, it is a function of the voltage across the capacitor bank. Thus, a higher voltage shortened the duration of the pulse. The duration of the pulse also was lengthened by increasing the capacitance or by increasing the inductance, and it was shortened by decreasing either of these quantities. The discharge characteristics of the circuit are described mathematically using known electrical equations.

In the present system, various inductances were connected in series with the lamp to provide an additional parameter which was varied to control the duration of the light flash. Ordinarily, the light flash was adjusted from a few hundred microseconds duration to a few milliseconds. Thus, the same lamp was operated at high power when the stored electrical energy was discharged in a relatively short time, i.e. of the order of hundreds of microseconds, or at lower power when the same quantity of electrical energy was discharged over a longer time interval, i.e. of the order of milliseconds.

Various conventional means were utilized to focus the available light energy on a particular object or region. This was partly accomplished by shaping the lamp to a configuration that best illuminates the object or region of interest. Additional focusing was accomplished by the use of mirrors or reflecting surfaces to direct the light toward the desired location. For example, a coiled or helical lamp was surrounded by a cylindrical polished aluminum reflector in order to concentrate most of the available light along the axis of the lamp helix. This significantly increased the light intensity available within the cylindrical core of the helix, permitting more efficient use of the lamp output at a given energy.

All of these techniques and improvements involving production, control and focusing of the high intensity light pulses are suitably employed in carrying out the process of this invention.

The basic equipment and principles in the area of light pulse heating are set forth by L. S. Nelson. (Nelson, L. S., Intense Rapid Heating With Flash Discharge Lamps, Science, vol. 136, No. 3513, p. 296, April 27, 1962.)

It will be appreciated that there are numerous other methods of producing a light pulse by chemical and mechanical means. In particular, this high intensity light pulse can be produced by the use of conventional photoflash bulbs, for example. All of these equipment variations for producing light pulses are contemplated within the scope of the present invention.

When the light energy emitted by the photoflash lamp is incident on the surface of an exposed object, part of the light is reflected by the surface and the remainder is either transmitted by the object or absorbed within the body of the object. The reflectivity is dependent upon the condition of the surface, the nature of the material exposed and the wave length of the incident light, as well as the angle of incidence. The absorptivity is dependent upon the nature of the material and the wave length of the light. The amount of light energy absorbed contributes to the overall energy of the irradiated specimen, thus tending to raise its temperature. If the light energy is absorbed in a time that is too brief to allow significant dissipation of the excess energy to the surroundings, the temperature rise will be controlled only by the specific heat of the absorbing body itself. Thus, the temperature rise for a given quantity of absorbed light energy will be greater for a body of small dimensions, having a correspondingly smaller mass, than for a body of the same material of larger dimension and, accordingly, a larger mass. It is also true that, since the amount of light absorbed depends upon the area of surface exposed to the light, certain geometrical shapes may attain higher temperature for a given light pulse than others, even though the mass of absorbing material is kept constant.

Another factor of importance is the thermal conductivity of the absorbing body. If the absorber is a poor heat conductor, the absorbed energy may heat one region of the absorber to rather high temperatures while other regions of the absorber farther away from the illuminated surface may be only slightly affected. Thus, the heating effect can be localized. Objects of this nature can be effectively heated in localized regions without the necessity of the very short duration, higher energy light pulses necessary to reach equivalent temperatures in good heat conductors, such as metals, having the same surface area to mass ratio. It will be noted that organic materials, such as polyurethanes, have both low thermal conductivities and low specific heat values, allowing them to be significantly heated by exposure to relatively long duration, lower energy pulses of light. The temperatures available by this method are sufficient to volatilize and thermally decompose portions of the absorbing body.

In the process of the present invention, light pulses are utilized to produce inorganic and organic reticulated materials. Unexpectedly, it has been found that all or part of the membranes in a cellular material can be melted, decomposed or volatilized by a light pulse. The membranes are destroyed because of the absorption of energy by the membranes which because of their very thin dimension causes the temperature to rise and they are volatilized. The extent of reticulation can be controlled by regulating the total amount of energy from the photoflash lamp and by selective irradiation of the sample. The following nonlimiting examples are illustrative of the process of the present invention and the products produced thereby.

Example III is illustrative of the treatment of a polyester polyurethane cellular material in accordance with the present invention.

EXAMPLE III

A charcoal colored polyester polyurethane cellular material, produced by the method of Example I, was used. The skeletal structure of this cellular material was thicker than the cell membranes. The specimen measured 3/32 inch by 1/2 inch by 2 inches and contained 80 cells per inch and essentially all of the cell membranes were intact. The charcoal color in the material was produced by incorporating 2% finely divided carbon black in Step B before foaming in the process of Example I.

The sample was mounted in the center of a helical tube, such as that shown in FIGURE III, and the circuit shown in FIGURE IV was used. The lamp was surrounded by a cylindrical aluminum reflector, the axis of the lamp and reflector being in line. The dimensions of the lamp were as follows:

| | |
|---|---|
| Outside diameter helix | 2 3/16 inches. |
| Inside diameter helix | 1 1/2 inches. |
| Tube diameter | 7/16 inch O.D. |
| Turns | 5. |
| Helix length, along axis | 3 inches. |

The aluminum reflector used had a length of 7 3/16 inches, a diameter of 4 inches and its interior surface was polished and anodized to a mirror finish. The lamp contained xenon gas at less than atmopheric pressure and was constructed of a clear fused quartz, with a wall thickness of approximately 1 1/2 to 2 millimeters. A cylindrical quartz tube was positioned between the sample and lamp in order to protect the photoflash lamp from contamination.

The lamp was connected to a 90 microfarad capacitor bank as in FIGURE IV and a 10 microhenry inductance was put in series with the lamp. The voltage was adjusted to 4 kilovolts. The trigger circuit was actuated, causing the lamp to fire and create a light pulse which in turn illuminated the specimen. The energy input to the lamp was about 720 joules.

After exposure, the specimen was checked microscopically and it was found that about 50% of the cell membranes had been destroyed by the single light pulse. It was found that this result was easily reproducible from sample to sample.

The specimen was again subjected to a second light pulse at the same equipment settings and it was found that the thus treated sample had essentially all its membranes removed or destroyed.

Illustrative of the production of completely membrane destroyed materials with a single light pulse are Examples IV and V.

EXAMPLE IV

The procedure and equipment of Example III was used. A charcoal colored polyester polyurethane cellular material, produced by the method of Example I, was used. This specimen measured 1/4 inch by 3/4 inch by 2 inches and contained 10 cells per inch. A pyrex tube was placed between the same and the photoflash lamp to filter out most of the ultraviolet light produced by the photoflash lamp. The specimen was exposed to a single light pulse. The equipment had a voltage setting of 5 kilovolts with a 126 microfarad capacitor bank and with a 200 microhenry inductant added to the system. The energy input to the lamp was about 1575 joules. The reticulated material produced was completely membrane destroyed by the single light pulse.

EXAMPLE V

The procedure and equipment of Example III was used. A charcoal colored polyester polyurethane cellular material produced by the method of Example I was used. The specimen measured 1/4 inch by 1 1/4 inches by 2 inches and contained about 45 cells per inch.

The specimen was flashed once at a voltage setting of 5 kilovolts with 198 microfarad capacitor bank with a 41 microhenry inductance in the system. The energy input to the lamp was about 2475 joules. The reticulated material produced was completely membrane destroyed. It was found that at this particular setting the ends of the skeletal structure strands on the surfaces directly exposed to the light pulse showed a certain amount of globulation or melting. This globulation was produced because of the high energy input to the particular sample. At lower energy levels, as in Examples III and IV, this globulation was not present.

Example VI is set forth to illustrate in particular the results achieved with a different photoflash lamp configuration and with multiple pulses.

EXAMPLE VI

A 45 cell per inch charcoal polyester polyurethane sample measuring 1/8 inch by 2 inches by 2 inches was used.

The procedure and equipment was the same as that in Example III except that four straight photoflash lamps were used. The dimensions of the individual lamps are: tube diameter (O.D.) 7/16 inch and length long axis 3 5/16 inches. (ZX2G15 made by Kemlite Laboratories, Inc., Chicago, Illinois.) The lamps were vertically mounted on a stand and connected together in electrical series and this combination in turn was connected in electrical parallel with the capacitor bank. The combined active length (distance between electrodes of individual lamp) of the four lamps was 9 inches. The lamps were mounted on about a 2 inch radius circle on the stand and equidistant from each other and were surrounded by a polished reflector.

The sample was positioned at about the center of and along the axis of the cylindrical configuration formed by the lamps. The equipment was fired at 6 kilovolts with 90 microfarads capacitance and with a 10 microhenry inductance added to the system. The energy pulse to the lamps was about 1620 joules. The equipment was fired three more times.

The sample was removed from the equipment and examined. It was found that the sample was completely reticulated.

Examples III–VI illustrate the reticulation of polyester polyurethane materials by the use of various equipment settings. Controlled reticulation was achieved by regulating the energy output of the lamp. Illustrative of the process of the present invention with regard to the membrane destruction of polyether polyurethane cellular materials is Example VII. These cellular polyurethane materials have been found to be more difficult to reticulate by the prior art methods.

EXAMPLE VII

In this experiment, a yellow colored polyether polyurethane cellular material produced by the method of Example II was used. The skeletal structure of this cellular material was thicker than its cell membranes. The sample measured 0.3 by 1.0 by 3.0 centimeters and all of the cell membranes were intact. The cells measured about 1/20 inch to 1/100 inch in diameter with a random distribution of sizes.

The procedure and equipment of Example III was used. The sample was mounted in the center of the lamp helix. The lamp was triggered when a 72 microfarad capacitor bank was charged to 8 kilovolts with a 41 microhenry inductance added to the system. The energy input to the lamp was about 2304 joules.

After exposure, the sample was checked microscopically and it was found that substantially all of the cell membranes were destroyed, thus producing a completely reticulated material with a single light pulse. The sample exhibited a slightly darker yellow color after the exposure. There was no other physical change in the sample and no apparent chemical residues could be found.

The process of Example VII was repeated sequentially at lower capacitance and voltage settings, usually with variation of the inductance, and it was found that the percentage destruction of the cell membranes in the sample could be regulated precisely by regulating the energy output of the lamp. The polyether polyurethane materials were easily reticulated by the process of the present invention.

There are numerous variations on the basic process of the present invention. In certain instances it was found that it was beneficial to pretreat the starting foam materials in various ways. One method of pretreatment is to coat the cellular material with a light absorptive material which does not evaporate upon heating. Such materials include, for example, carbon, graphite, various metal salts such as the metal sulfides and metal oxides, e.g. iron oxide, lead oxide and titanium oxide. Illustrative of the use of this pretreatment step are Examples VIII–XIV.

EXAMPLE VIII

In this experiment the charcoal colored polyester polyurethane foam, produced by the method of Example I, was used. The sample measured 1/4 inch by 2 inches by 2 inches and contained about 45 cells per inch.

The sample was treated with 0.216% by weight of finely divided carbon black dispersed in 99.784% of a 50–50 mixture of commercial technical grade denatured ethanol and tap water. The sample was then air dried.

The sample was then exposed to intense light energy using the procedure and equipment of Example III, set at 7 kilovolts with 36 microfarads capacitance and with a 200 microhenry inductance added to the system. The input to the lamp was about 880 joules.

The sample was examined and it was found that essentially all of the membranes were destroyed in the single flash to a depth of about 1/16 inch in the sample. The product was very uniformly reticulated and the sample had a very uniform appearance.

EXAMPLE IX

A beige colored, about 100 cells per inch pore size, polyester polyurethane, produced by the method of Example I, measuring 1/16 inch by 2 inches by 2 inches was treated with 0.216% carbon black dispersed in 99.784% of a 50–50 water-ethanol (denatured) solution and air dried. The sample was placed in a Pyrex test tube to filter out ultraviolet light and placed in the center of the photoflash lamp helix.

The sample was exposed to a light pulse, using the procedure and equipment in Example III set at 7 kilovolts with 36 microfarads capacitance and with a 200 microhenry inductance added to the system. The lamp input was about 882 joules of energy. The resulting specimen was completely reticulated and slightly darker in color.

The process of this example was repeated on fresh specimens of the same material at 6 kilovolts and the result was the same. The lamp input was about 748 joules. When this example was repeated at 5 kilovolts the surface membranes in the sample were destroyed, but not the interior membranes. The lamp input was about 450 joules. At 3.2 kilovolts, 90 microfarads capacitance and with 200 microhenry inductance, the sample was completely reticulated. The lamp input was about 460 joules. This example thus illustrates the effect of expanding the duration of the light pulse by increasing the capacitance and decreasing the voltage.

Examples X and XI illustrate in particular the variance of result by changing the inductance and thus increasing the duration of the light pulse.

EXAMPLE X

In this experiment the charcoal colored polyester polyurethane foam produced by the method of Example I was used. The sample measured 1/4 inch by 1 1/2 inches by 2 inches and contained about 45 cells per inch.

The sample was treated with a 1% aqueous dispersion of a finely divided graphite and then air dried.

The sample was then exposed to a single light pulse using the procedure and equipment of Example III set at 7 kilovolts with 36 microfarads capacitance and with a 41 microhenry inductance in the system. The lamp input was about 882 joules of energy.

The exposed sample was examined with the naked eye and under a microscope and was found to be almost completely reticulated. The sample exhibited no apparent shrinkage, warping or globulation.

EXAMPLE XI

In this example, a 45 cell per inch charcoal colored polyester polyurethane foam, produced by the method of Example I, was treated with a 1% aqueous finely divided graphite dispersion and air dried. The sample measured 1/4 inch by 2 inches by 2 inches.

The specimen was then exposed to a light pulse, using the procedure and equipment of Example III set at 7 kilovolts with 36 microfarads capacitance and with a 200 microhenry inductance added to the system. The lamp input was about 882 joules. The specimen appeared to be no more than 50% reticulated.

The specimen was then reflashed at the same setting and the result was 80% to 90% reticulation. In both instances the samples appeared to be unchanged except for the destruction of the cell membranes.

When compared to Example X where a 41 microhenry inductance was used, it was apparent that the results in this Example were identical to those in Example X in terms of the appearance of the sample, but that the extent of reticulation was reduced per pulse. This appears to have resulted from the increased duration of the light pulse.

Example XII is illustrative of the treatment of a polyether polyurethane by the process of the present invention.

EXAMPLE XII

A polyether polyurethane, about $1/20$ inch to $1/100$ inch cell diameter, random distribution, yellow colored, $1/4$ inch thick cellular material, produced by the method of Example II, was treated with a 1% aqueous graphite dispersion and air dried.

The sample was exposed to a light pulse, using the procedure and equipment of Example III set at 7 kilovolts with 90 microfarads capacitance and with a 200 microhenry inductance added to the system. The lamp input was about 2200 joules.

Partial reticulation to a relatively shallow depth was achieved. A second treatment under the same conditions resulted in the complete reticulation of the sample.

It was found that the organic cellular materials were more easily reticulated when preheated with an incompatible material. Thus, hot water, steam and various like materials were used in this pretreatment. It is believed that this pretreatment caused a "blushing" or adsorption of material on the cell membranes. This in turn makes the membranes relatively more opaque to light and therefore more light absorbent. Thus, when organic foams, such as the polyurethanes were subjected to light pulses after the pretreatment, it was found that the energy requirement for reticulation was reduced. Further, it was found that the light colored foams with a very large number of cells per inch could be easily reticulated without discoloration in this manner. Illustrative are Examples XIII and XIV.

EXAMPLE XIII

An about 100 cell per inch, beige polyester polyurethane measuring $1/16$ inch by 2 inches by 2 inches, produced by the method of Example I, was pretreated by boiling in water which caused the membranes in the sample to "blush" but not long enough to remove the membranes by hydrolysis and then removed from the water. The excess water was squeezed out of the sample.

The sample was then immediately exposed to a single light pulse at 7 kilovolts, 90 microfarads capacitance with a 200 microhenry inductance added to the system using the procedure and equipment of Example III. The lamp input was about 2200 joules of energy. The sample was almost completely reticulated but otherwise appeared unchanged when compared to the control. The sample was again pretreated and reflashed and the sample was essentially completely reticulated.

EXAMPLE XIV

An about 100 cell per inch beige polyester polyurethane cellular material, produced by the method of Example I, measuring $1/16$ inch by 2 inches by 2 inches was used. The sample was pretreated by subjecting it to steam treatment for ten seconds to cause blushing of the cell membranes.

The sample was then immediately positioned in the center of the helical coil using the equipment and procedure of Example III. The photoflash lamp was fired at 5 kilovolts with 90 microfarads capacitance and with a 200 microhenry inductance added to the system. The energy input to the lamp was about 1125 joules.

The sample was examined and it was found that it was almost completely reticulated by the single light pulse.

The processes of Examples III–XIV were repeated using various lamp configurations and reflectors. Illustrative of the various lamps used are those set forth in Table I.

TABLE I

| | Helical Lamp HH-500-1 (made by Kemlite Labs. Inc., Chicago, Ill.) | Helical Lamp HH-300-1 (made by Kemlite Labs. Inc., Chicago, Ill.) |
|---|---|---|
| Outside diameter helix ........ inches.. | $6\frac{1}{8}$ | $4\frac{3}{16}$ |
| Inside diameter helix ........ do.... | 5 | $3\frac{1}{16}$ |
| Tube diameter O.D ........ do.... | $\frac{9}{16}$ | $\frac{9}{16}$ |
| Turns........ | 7 | 11 |
| Helix length long axis ........ inches.. | 4 | $7\frac{1}{2}$ |

Illustrative of the reflectors used are those set forth in Table II.

TABLE II

| | | |
|---|---|---|
| Reflectors: | | |
| Length ........ inches.. | $10\frac{1}{2}$ | $7\frac{3}{16}$ |
| Diameter ........ do.... | 5 | 4 |

All lamp and reflector combinations were found to be suitable.

The controlled reticulation of organic cellular materials of all types can be rapidly accomplished by the process of the present invention. Examples of other organic cellular materials which can be treated by the process of the present invention are the polystyrene and polyethylene foams. The products produced by the process of the present invention are strong and resistant to deterioration. Further, they are relatively free from contaminants produced from the destruction of the cell membranes by the process of the present invention.

It is further possible to produce products by the process of the present invention wherein there is not only controlled destruction of the cell membranes, but also selective destruction of the cell membranes. Since the light energy which destroys a given cell membrane can be directed from a point approximately normal to the surface of the membrane, it has been found that oriented reticulation can be achieved in this manner. Thus, it is possible to destroy only those membranes approximately normal to the direction of the light. Such products are extremely valuable in various filtering and detraining applications. A selective effect can also be achieved by shielding the photoflash lamps such that only the membranes to be destroyed are exposed to the light pulse. Various focusing techniques can also be used. Illustrative is Example XV.

EXAMPLE XV

A 10 pore per inch charcoal colored polyester polyurethane cellular material, produced by the method of Example I, was used.

A helical lamp was used (HH-500-1, Table I) in the equipment used in Example III. A $1/4$ inch by 2 inches by 2 inches sample was positioned parallel to the long axis and outside of the lamp and a window glass plate was positioned between the lamp and the sample such that it was $1/4$ inch from the sample and the lamp. The sample was thus $1/2$ inch from the lamp. A semicircular polished aluminum reflector was positioned around the lamp on the side opposite from the sample to focus the light on the sample.

The lamp was flashed at 10 kilovolts with 198 microfarads capacitance and with a 200 microhenry inductance added to the system. The energy input to the lamp was about 9900 joules.

The sample was examined and it was found that all of the membranes had been destroyed except those approximately parallel to the direction of the light pulse. Thus, a novel, oriented and partially reticulated material was produced by radiation from one side only.

In certain instances in the foregoing examples a cylindrical Pyrex glass tube was positioned between the photoflash lamp and the sample in order to shield the sample from ultraviolet light which is absorbed by the glass material. This was done to eliminate ultraviolet light as a variable in the treatment of the foams.

The foregoing examples illustrate in detail the method of producing the preferred novel organic reticulated materials, in particular polyurethane materials, of the present invention. It will be appreciated that the method of the present invention can be used to produce novel inorganic reticulated products. In general, it was found that the inorganic materials require a higher energy pulse from the photoflash lamp. In certain instances the pretreatment of the inorganic cellular material was found to be beneficial.

The electrical costs involved per light pulse are generally on the order of a small fraction of a cent. Thus, the process of the present invention presents a method for producing very inexpensive reticulated products without the use of liquids or direct chemical contact.

The photoflash equipment can be modified so that a continuously moving sheet of polyurethane foam can be irradiated. The lamp can be constructed so that ten or more pulses per second can be initiated. Further, multiple lamps can be used. All of these equipment modifications are within the skill of the art.

It is intended that the foregoing description be illustrative of the present invention and that this invention be limited only by the scope of the hereinafter appended claims.

I claim:

1. In a process for the preparation of a reticulated material, the step which comprises:
(*a*) exposing a cellular material, having some cell membrane thicknesses less than the thickness of its skeletal structure, said membranes being heat removable, to a light pulse to remove at least some of said cell membranes.

2. The process of claim 1 wherein said cellular material is a polyurethane.

3. In a process for the preparation of a reticulated material, the steps which comprise:
(*a*) providing an electromagnetic energy absorbing material on the surface of a cellular material; and
(*b*) exposing the cellular material, having some cell membrane thicknesses less than the thickness of its skeletal structure, said membranes being heat removable, to a light pulse to remove at least some of said cell membranes.

4. The process of claim 3 wherein said energy absorbing material is carbon.

5. In a process for the preparation of a reticulated material, the step which comprises:
(*a*) exposing a cellular material comprising a skeletal structure and cell membranes having thicknesses less than the thickness of its skeletal structure, said membranes being heat removable, to a light pulse to remove at least some of said cell membranes.

6. In a process for at least the partial destruction of the heat removable membranes present in a material comprising a skeletal structure and said membranes, the thickness of said membranes being less than the thickness of said skeletal structure, the step which comprises:
(*a*) applying a light pulse to remove at least some of said membranes.

7. The process of claim 6 wherein said material is an organic material.

8. The process of claim 6 wherein said material is a polyurethane.

9. The process of claim 6 wherein said skeletal structure is of essentially the same composition as said membranes.

10. In a process for the preparation of a reticulated material, the steps which comprise:
(*a*) pretreating the membranes of a cellular material with a second material to make them more light absorptive by providing the second material within the cell membranes; and
(*b*) exposing the cellular material, having some cell membrane thicknesses less than the thickness of its skeletal structure, said membranes being heat removable, to a light pulse to remove at least some of said cell membranes.

11. The process of claim 10 wherein said second material is steam.

12. In a process for at least partial destruction of the heat removable membranes present in a material comprising a skeletal structure and said membranes by selective removal of said membranes, the thickness of said membranes being less than the thickness of said skeletal structure, the step which comprises:
(*a*) selectively applying a light pulse to the membranes to be removed thereby removing at least some of said cell membranes, the light pulse being selectively applied by providing an opaque shield having holes through it in the direction of the light pulse between the light pulse and the material which only allows light to pass through the holes to the membranes to be removed.

13. The process of claim 12 wherein said material is a polyurethane foam.

References Cited by the Examiner

UNITED STATES PATENTS

| | | | |
|---|---|---|---|
| 2,825,282 | 3/58 | Gergen et al. | 264—25 XR |
| 2,881,470 | 4/59 | Berthold et al. | 264—22 XR |
| 2,961,710 | 11/60 | Stark | 264—321 |

ALEXANDER H. BRODMERKEL, *Primary Examiner.*